United States Patent [19]

Lindberg

[11] 3,924,164

[45] Dec. 2, 1975

[54] HIGH TEMPERATURE BERYLLIUM OXIDE CAPACITOR

[75] Inventor: Russell A. Lindberg, Westlake, Ohio

[73] Assignee: The United States of America as represented by the United States National Aeronautics and Space Administration Office of General Counsel-Code GP, Washington, D.C.

[22] Filed: Jan. 28, 1975

[21] Appl. No.: 544,611

[52] U.S. Cl. ............................ 317/258; 317/261
[51] Int. Cl.[2] ...................... H01G 4/12; H01G 1/01
[58] Field of Search ........ 317/258, 261; 174/DIG. 5

[56] References Cited
FOREIGN PATENTS OR APPLICATIONS
466,388  3/1937  United Kingdom................. 317/258

OTHER PUBLICATIONS

Als. Mag Beryllia Ceramics Bulletin, No. 693 of American Lava Co., Chattanooaga, Tenn., Mar., 1971.

Von Hippel, "Dielectric Materials & Applications," Wiley & Sons, N.Y., 1963, p. 306.

Primary Examiner—E. A. Goldberg
Attorney, Agent, or Firm—N. T. Musial; J. A. Mackin; John Manning

[57] ABSTRACT

A capacitor suitable for use in environments where the temperature (is) as much 1,500° Centigrade (2,732° F) is provided. The capacitor comprises a BeO wafer which has been off-sputtered on each side and having an electrode of Iridium on each side, the electrodes having been deposited by sputtering, or ion plating.

A barrier layer of BeO may be deposited on one or both of the electrodes to prevent diffusion bonding of the electrodes of adjacent capacitors due to temperature, pressure and vacuum when a plurality of capacitors are stocked.

9 Claims, 2 Drawing Figures

HIGH TEMPERATURE BERYLLIUM OXIDE CAPACITOR

ORIGIN OF THE INVENTION

The invention described herein was made by an employee of the United States Government and may be manufactured or used by the Government without the payment of any royalties thereon or therefor.

BACKGROUND OF THE INVENTION

Future electrical power systems for use on space vehicles will require magnetic materials, electrical conductors, electrical insulation, capacitors and other components having long life and long term stable operation at high temperatures in vacuum as well as in alkali metal environments. Most capacitors available from commercial sources have maximum allowable operating temperatures of less than 426.7° C (800° F). They are also very bulky and have high electrical losses at high temperatures.

The most successful capacitor thus far developed comprises pyrolitic boron nitride wafers having platinum electrodes applied thereto by sputtering. These capacitors operate satisfactorily at temperatures up to 593.3° C (1,100° F). However, at temperatures above 593.3° C performance is sporadic and unreliable.

OBJECTS AND SUMMARY OF THE INVENTION

It is an object of the invention to provide an improved high temperature capacitor having a relatively long life at temperatures below 800° C.

It is another object of the invention to provide a capacitor which operates reliably up to about 1,500° C.

It is a further object of the invention to provide a high temperature capacitor which does not require the use of gold, platinum, or rhodium electrodes, which materials have a significantly higher vapor pressure than Iridium at temperatures above 500° C.

It is still another object of the invention to provide a high temperature capacitor wherein the dielectric material is more readily available, less expensive and more adaptable to manufacturing processes than previously used materials.

DESCRIPTION OF THE PREFERRED EMBODIMENT

Figure 1:
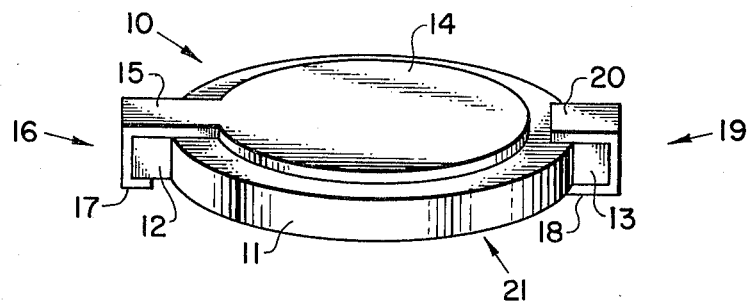
FIG. 1 is an oblique, pictorial view of a capacitor made in accordance with the invention.

Referring now to FIG. 1, there is shown a capacitor 10 comprising a disc 11 of BeO having radially extending tabs 12 and 13. An electrode 14 of Iridium is attached to the upper surface of the beryllium oxide disc 11 as shown. The electrode 14 is of substantially smaller diameter than disc 11 and includes a radially extending portion 15 which wraps around the outer end of tab 12, as shown at 16 and back under tab 12 to form a contact 17. A similar electrode 21 is attached to the lower surface of disc 11 and includes an extension portion 18 which wraps around tab 13 as at 19 and then back over tab 13 to form a contact 20.

The capacitor of FIG. 1 is made in the following manner. First, wafers 8 to 12 mil thick are sliced from a body of BeO and are shaped into platelets in the form of discs having radially extending tabs. The discs are then reduced in thickness to from 1 to 5 mils preferably by mechanical lapping. The wafers are then placed in the sputtering chamber and the pressure reduced to about $1 \times 10^{-6}$ torr and both the upper and lower surfaces of the disc are off-sputtered for about 30 minutes to remove from about 2,800 to 5,000 angstroms of surface material. This produces a surface texture ratio (STR) of from about 5 to 7 where STR is defined as the ratio of true surface area to the projected or geometric surface area.

After the off-sputtering step, electrodes of Iridium are sputtered on to the respective upper and lower surfaces of the disc, together with the extensions and contacts as described with respect to FIG. 1. This procedure produces a capacitor as shown in FIG. 1.

While the capacitor made, as described above, utilizes discs of BeO it will be understood that platelets of other geometric shapes may be used. Thus, the platelets may be square, elliptical, hexagonal or any other shape.

The resistivity of BeO decreases as its temperature increases due to impurities. At some point, as temperature increases, BeO will become a semiconductor. This cannot be tolerated in a capacitor dielectric because there will be electrical breakdown.

Accordingly, the BeO utilized in the high temperature capacitor of the invention requires BeO having a purity of equal to or greater than 0.99999 percent. This provides greater electrical strength than that of the best prior art high temperature capacitors which utilized pyrolytic boron nitride (BN) as the dielectric. The pyrolytic BN had a voltage breakdown of 11,000 volts/mil at room temperature and 9,000 volts/mil at 1,100° F.

The coefficient of expansion of commercial high purity Iridium is close to that of BeO used as a dielectric between the Iridium electrodes of the capacitor embodying the invention. However, if oxygen content of the Iridium is minimized to the extent explained hereinbelow, its coefficient of expansion will increase. This is not objectionable relative to the instant invention because of the strong mechanical interlock between the Iridium and the BeO and, further, because Young's modulus is reduced to about $1-7 \times 10^6$ psi so the Iridium is relatively soft.

The reasons for minimizing the oxygen content of the Iridium are that the oxygen will diffuse more rapidly into the BeO at temperatures above 1,100° C and the Iridium will evaporate leaving an irregular surface which will disassociate and weaken the bond between the Iridium electrodes and the BeO dielectric. For the capacitor embodying the invention to operate up to 1,500° C, the Iridium should have an oxygen content of less than 1 part per million (ppm) by weight. However, with up to 10 ppm oxygen content in the Iridium, satisfactory operation of the capacitor up to about 1,000° C can be achieved.

Figure 2:
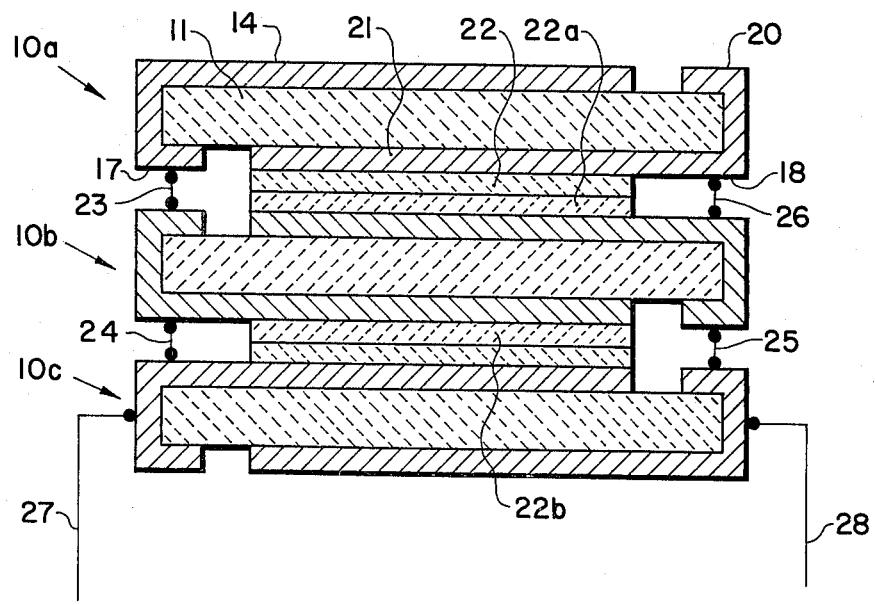
FIG. 2 is a cross-section view of a stack of capacitors made in accordance with the invention.

Referring now to FIG. 2, there is shown a stack of 3 of the capacitors, as shown in FIG. 1 except for slight modifications. Parts corresponding to those shown in FIG. 1 are identified by like numerals. Because of the temperature and the pressure to which stacked capacitors are subjected, diffusion bonding often takes place between the electrode surfaces which are in contact with the next or other adjacent capacitors. To avoid such diffusion bonding, capacitor 10b of the stack shown in FIG. 2 is provided with a diffusion barrier 22a on one electrode and a diffusion barrier layer 22b on the other electrode. This diffusion barrier is preferably BeO, but for temperatures below 1,100° F other materials such as boron nitride may be used. The barrier layers 22a and 22b are from about 50 to 500 Angstroms thick and are deposited on the electrodes by sputtering procedures.

Because capacitors 10 and 10c are in respective upper and lower positions, no barrier layer is provided on the electrodes which are at the respective upper and lower ends of the stack.

FIG. 2 shows connections 23, 24, 25 and 26 between the electrodes of the stacked capacitors. These connections are for purposes of illustration and are not used in an actual stack of capacitors because there is direct contact between one set of the pair of electrodes of each capacitor and between all of a second set of each pair of the electrodes of the capacitors. The direct contact is possible because, as indicated previously, the barrier layers are only 50 to 500 Angstroms thick and are not in the proportions of the barrier layers 22, 22a and 22b of FIG. 2 which are shown as very thick layers for illustrative purposes. Leads 27 and 28 may be connected to respective ones of the pair of electrodes of the capacitor 10c to provide connections into associated circuitry.

From the foregoing, it will be seen there is provided a high temperature capacitor having a BeO dielectric with Iridium electrodes which are attached by sputtering to the wafer which have a surface texture ratio of from about 5 to 7. Thin barrier layers are sputter-deposited on each electrode to prevent diffusion bonding between electrodes when a number of capacitors are arranged in a stack and subject to high temperature, pressure and vacuum.

It will be understood that those skilled in the art may make changes and modifications to the foregoing invention without departing from the spirit and scope of the invention as set forth in the claims appended hereto.

What is claimed is:

1. A high temperature capacitor comprising
   a platelet of BeO;
   a first electrode sputter bonded to one side of said platelet, which side has a surface texture ratio of from about 5 to 7 produced by off-sputtering, said electrode being of Iridium; and
   a second electrode sputter bonded to the other side of said platelet, which other side has a surface texture ratio of from about 5 to 7 produced by off-sputtering, said second electrode being of Iridium.

2. The capacitor of claim 1 wherein said electrodes are from 2,500 to 4,000 Angstroms thick.

3. The capacitor of claim 2 wherein said electrodes are about 3,500 Angstroms thick.

4. The capacitor of claim 1 wherein a layer of BeO from about 50–500 Angstroms thick is provided on at least one of said electrodes.

5. The capacitor of claim 4 wherein said BeO is about 300 Angstroms thick.

6. The capacitor of claim 4 wherein a layer of BeO is provided on both electrodes.

7. The capacitor of claim 1 wherein said platelet has a thickness of from 1–5 mils.

8. The capacitor of claim 1 wherein said platelet is a disc having at least two radially extending tabs and wherein said electrodes are circular and of a diameter substantially less than that of said platelet, each electrode having a tab extending radially outwardly on a respective one of said tabs and wrapping around the outermost end of each of said respective tabs and back the other side of each of said respective tabs.

9. The capacitor of claim 1 wherein the BeO has a purity equal to or greater than 0.99999 percent and the Iridium has less than 1 part per million by weight of oxygen.

* * * * *

UNITED STATES PATENT OFFICE
CERTIFICATE OF CORRECTION

PATENT NO. : 3,924,164
DATED : Dec. 2, 1975
INVENTOR(S) : Russell A. Lindberg

It is certified that error appears in the above-identified patent and that said Letters Patent are hereby corrected as shown below:

In column 2, line 30, for "0.99999" read "099.999".

In column 4, line 36, for "0.99999" read "099.999".

Signed and Sealed this fifteenth Day of June 1976

[SEAL]

Attest:

RUTH C. MASON
Attesting Officer

C. MARSHALL DANN
Commissioner of Patents and Trademarks